July 25, 1967

J. H. PERRY ETAL 3,332,406

ELECTRONIC SPEED CONTROL SYSTEM

Filed Aug. 24, 1965

INVENTORS
Jack H. Perry &
BY Ronald L. Colling

Albert F. Duke
ATTORNEY

July 25, 1967     J. H. PERRY ETAL     3,332,406
ELECTRONIC SPEED CONTROL SYSTEM
Filed Aug. 24, 1965     2 Sheets-Sheet 2
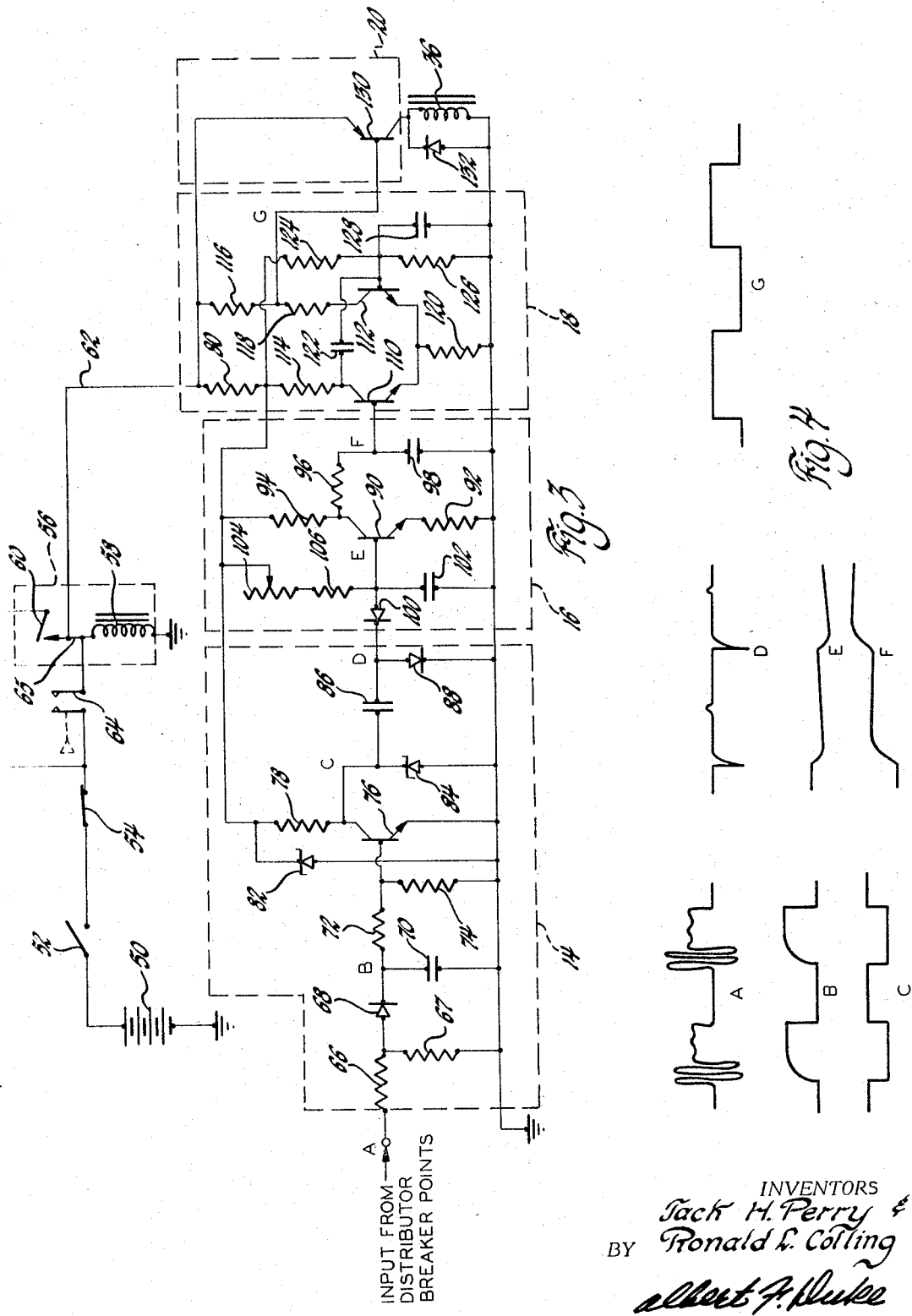
INVENTORS
Jack H. Perry &
BY Ronald L. Colling
Albert F. Duke
ATTORNEY United States Patent Office 3,332,406
Patented July 25, 1967

3,332,406
ELECTRONIC SPEED CONTROL SYSTEM
Jack H. Perry, Fenton, and Ronald L. Colling, Davison, Mich., assignors to General Motors Corporation, Detroit, Mich., a corporation of Delaware
Filed Aug. 24, 1965, Ser. No. 482,152
5 Claims. (Cl. 123—102)

This invention relates to vehicle control systems and more particularly to a vehicle engine speed control system utilizing electronic control circuitry for developing an engine throttle control signal for maintaining the actual engine speed at a desired engine speed independent of load conditions.

It is an object of the present invention to provide a speed control system having a minimum of moving parts and which may be easily installed in present vehicles.

It is another object of the present invention to provide a cruise control system which eliminates the necessity for special speedometer or mechanical speed sensing elements.

It is the further object of the present invention to provide a cruise control system having a proportional zone of control which eliminates hunting and which can be potentiometer adjusted to accommodate different vehicle characteristics such as transmission slippage or engine gain changes due to gearing or road loads.

In accordance with the present invention, electronic circuitry including pulse shaping, pulse counting, and amplifying networks is responsive to an input signal from the distributor breaker points of the vehicle for developing an error signal indicative of the difference between the actual engine speed and a potentiometer adjusted desired engine speed. A variable duty cycle multivibrator develops a constant frequency variable pulse width output signal proportional to the D-C error voltage which controls a servo power unit coupled to the engine throttle. The power unit adjusts the engine throttle to a position where the actual engine speed corresponds to the desired engine speed.

A more complete understanding of the present invention may be had from the following detailed description which should be read in conjunction with the drawings in which:

FIGURE 3 is a schematic diagram of the electrical control circuitry;

FIGURE 4 shows voltage waveforms at different junctions in the control circuit of FIGURE 3.

Figure 1:
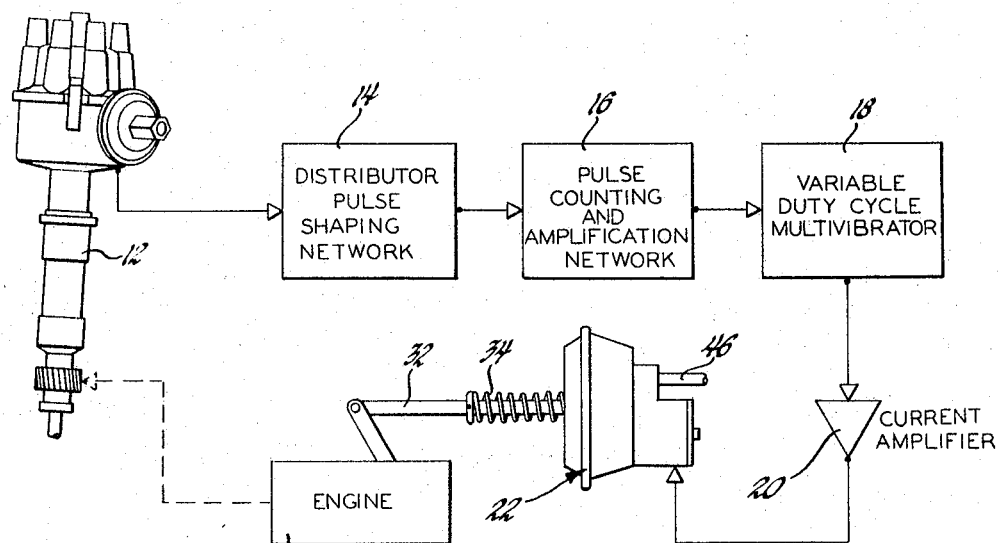
FIGURE 1 is a block diagram of the system of the present invention.

Referring now to the drawings and initially to FIGURE 1, the system is shown in block diagram and includes an internal combustion engine designated 10 which drives a distributor 12 to develop a pulsating input signal having a frequency corresponding to the actual speed of the engine. This input signal is applied to a pulse shaping network 14 and a pulse counting and amplification network 16 which integrates the pulsating signal to provide a D-C voltage which is compared against a potentiometer adjusted D-C voltage representing a desired engine speed to provide a D-C error voltage. The error voltage is applied to a variable duty cycle multivibrator 18 which produces a square wave output signal of constant frequency and variable pulse width. This signal is then amplified by a current amplifier 20 which drives a power unit 22 to position the throttle valve of the engine such that the error signal is reduced to some established level. In other words, the power unit 22 adjusts the throttle valve such that the engine speed is increased or decreased depending upon whether the actual engine speed is below or above the desired engine speed.

Figure 2:
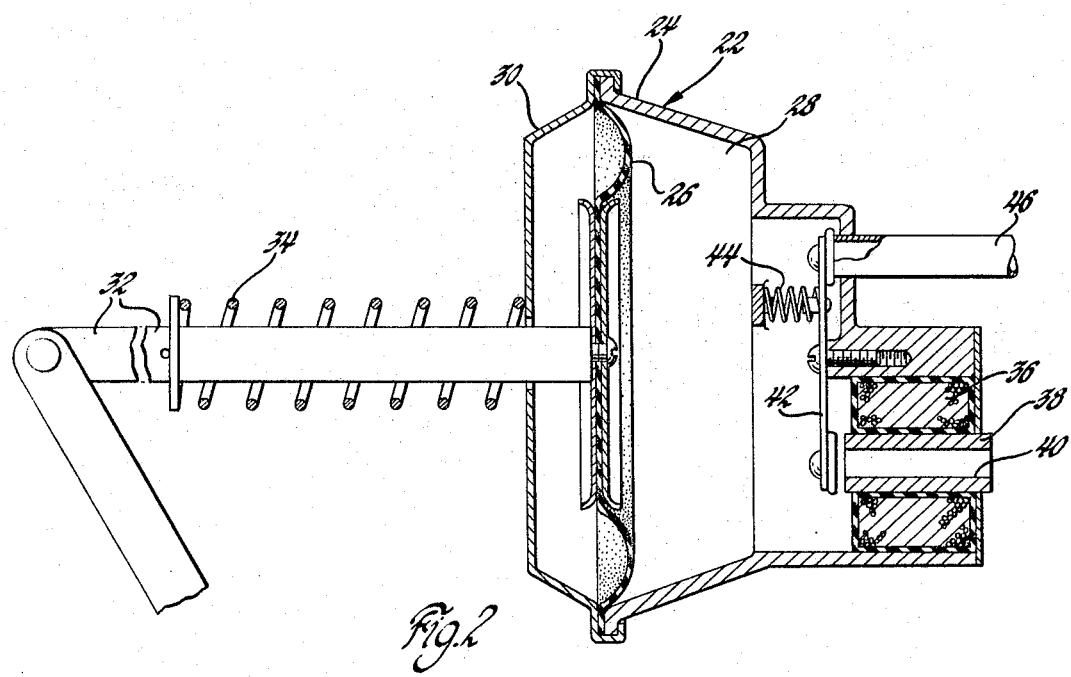
FIGURE 2 is a sectional view of the power unit utilized in the system.

Referring now to FIGURE 2, the power unit 22 comprises a housing 24 closed at one end by a flexible diaphragm 26 forming a chamber 28. The diaphragm 26 is protected by a cover 30 and is positioned in the unit 22 by the pressure existing in the chamber 28. The diaphragm 26 has attached thereto a throttle linkage 32 which is biased to the position shown by spring 34. The pressure in the chamber 28 is controlled by an electromagnetic valve assembly including a winding 36 supported by a core 38 having an atmospheric port 40 extending therethrough and communicating with the chamber 28. The electromagnet controls the position of an armature 42 which is biased to the position shown by a spring 44 to close a vacuum port 46 which communicates with the engine manifold. Energization of the winding 36 will open the vacuum port 46 and close the atmospheric port 40. The winding 36 is connected to the output of the current amplifier 20 and is consequently energized at a constant frequency but for a variable length of time depending upon the duty cycle of the signal from the amplifier 20.

Referring now to FIGURES 3 and 4, the control circuitry includes a source of voltage 50 which is preferably the vehicle battery which has one terminal grounded and the other terminal connected in series with the vehicle ignition switch 52 and a brake pedal position responsive switch 54. A relay 56 includes a coil 58 having an armature 60 such that energization of the coil 58 connects the battery 50 to the conductor 62. The coil 58 is under the control of a momentary contact switch 64 which is normally open but is closed by the operator to place the system in a speed control mode of operation. A hold-in circuit for the relay 56 is provided by a conductor 65 so that the switch 64 may be released after initial energization of the coil 58.

The pulse shaping network 14 includes resistors 66 and 67, diode 68 and capacitor 70 and resistors 72 and 74. A transistor 76 has its emitter grounded and its base connected to the junction between the resistors 72 and 74 with its collector connected through resistors 78 and 80 to the conductor 62. A zener diode 82 is connected between ground and the junction of the resistors 78 and 80 to provide a substantially constant voltage. A zener diode 84 and a differentiating network including a capacitor 86 and a diode 88 are connected across the emitter-collector electrodes of the transistor 76.

The network 16 comprises transistor amplifier 90 having its emitter connected to ground through a resistor 92 and its collector connected to the junction between voltage dividing resistors 94 and 96. A capacitor 98 smooths out any ripple existing in the output of the amplifier 90. A pulse counting network comprising a diode 100 and a capacitor 102 in conjunction with a manually set potentiometer 104 and a fixed resistor 106 establish a D-C voltage at the base of the transistor 90 indicative of the error existing between the actual engine speed and a desired engine speed. The potentiometer 104 is adjustable by the vehicle operator to set a desired engine speed.

The multivibrator 18 comprises a pair of transistors 110 and 112. The collector of transistor 110 is connected to the conductor 62 through the resistor 80· and a resistor 114. The collector of transistor 112 is connected to the conductor 62 through resistors 116 and 118. The emitters of transistors 110 and 112 are connected to ground through a resistor 120. The collector of transistor 110 is connected to the base of transistor 112 through a capacitor 122. The base of transistor 112 is connected to the junction of voltage dividing resistors 124 and 126. The base of transistor 112 is also connected to ground through a capacitor 128.

The current amplifier 20 includes a power transistor 130 having its base connected to the collector of transistor 112 through resistor 118 and its emitter connected to the conductor 62. A diode 132 is connected across the winding 36 of the electromagnet which is connected to the collector of transistor 130.

OPERATION

In describing the operation of the system reference will be made to FIGURES 4A–4G which represent the waveforms at junctions A–G designated in FIGURE 3. When it is desired to place the system in a cruise control mode of operation, the operator closes the switch 64 connecting battery 50 to the conductor 62. As shown in FIGURES 4A and 4B the amplitude of the input signal from the distributor breaker points is reduced by the resistors 66 and 67 and the negative going high frequency ringing is eliminated by the diode 68 while the positive going ringing is filtered by the capacitor 70. The transistor 76 inverts the input waveform shown in FIGURE 4B and the zener diode 84 limits the output amplitude to its zener voltage as shown in FIGURE 4C. The waveform shown in FIGURE 4C is then differentiated as shown in FIGURE 4D by the capacitor 86 and diode 88. The diode 100 accepts only the negative differentiated spikes and the capacitor 102 establishes a D.-C. voltage that is directly proportional to engine speed. The difference between this D.-C. voltage and the D.-C. voltage established by the potentiometer 104 is shown in waveform 4E and is amplified and inverted by the transistor 90. The D.-C. error signal shown in FIGURE 4F is then applied across the base and emitter electrodes of transistor 110 of multivibrator 18.

The base bias of the transistor 112 is set at a level such that the transistor 112 is conducting but is not in saturation. A voltage is thus established at the common emitters by current flow through the transistor 112 and resistor 120. When a sufficient voltage is applied to the base of transistor 110 to start it conducting, the current through the resistor 114 causes the collector voltage of transistor 110 to drop below the voltage established by the zener diode 82 causing a negative spike to be fed through the capacitor 122 to lower the base of transistor 112. This tends to turn off transistor 112 and tends to turn on transistor 110 causing the multivibrator to switch. The current through transistor 110 which is a function of the voltage applied to its base establishes some new voltage at the common emitters. The voltage at the base of transistor 112 goes below its normal voltage and then decays upward toward its normal level through the time constant established by resistors 114, 124, and 126 and capacitor 122. When this voltage has risen sufficiently above the voltage established at the common emitters by transistor 110, transistor 112 starts conducting again. This raises the voltage at the common emitters which tends to turn transistor 110 off. When transistor 110 turns off, a positive spike is fed to the base of transistor 112 through the capacitor 122 which drives the transistor 112 toward saturation and thus switches the multivibrator back to its initial state. As the base voltage of transistor 112 decays toward its normal value through the time constant, the voltage at the common emitters also decays toward this normal value. However, when the voltage at the common emitters reaches the point where the voltage on the base of transistor 110 is sufficient to cause the transistor 110 to conduct, the cycle is repeated.

The higher the input voltage to the base of transistor 110, the harder it turns on during that half of the cycle. Thus the voltage at the common emitters will be higher so that the transistor 112 will remain off longer because its base voltage has to reach a higher level before the other half of the cycle can occur. Likewise, the higher the input voltage on transistor 110, the shorter time transistor 110 remains off because the voltage at the base of transistor 112 and the common emitters does not have to decay as far before transistor 110 starts conducting again. The output waveform of the multivibrator 18 is shown in FIGURE 4G.

At some input to transistor 110 the voltage at the common emitters will be high enough so that transistor 112 will not be able to turn on. Likewise, at a lower input transistor 110 will not be able to turn on. Between these upper and lower input limits, the multivibrator 18 is free running with on and off times a linear function of the D.-C. error voltage. When the engine speed and the set speed are equal, the on and off times of the transistors 110 and 112 are equal.

The current amplifier 20 reproduces the output from the multivibrator 18 and provides sufficient current gain to energize the electromagnet winding 36. When the engine speed is below the desired manual set speed, the current amplifier 20 energizes the winding 36 causing the armature 42 to close the atmospheric port 40. Thus the vacuum port 46 is opened allowing the diaphragm chamber pressure to drop. The power unit throttle rod 32 now opens the throttle. When the engine speed nears the desired set speed, for example 200 r.p.m. below the set speed, the multivibrator 18 becomes astable and the current amplifier 20 is pulsed on and off causing the armature 42 to alternately close and open the atmospheric port 40. This produces a modulated pressure in the diaphragm chamber 28 causing the power unit throttle rod 32 to partially close the throttle. If the engine speed exceeds the desired set speed by, for example 200 r.p.m., the multivibrator 18 biases the current amplifier off which in turn allows the armature 42 to close the vacuum port 46 and expose the diaphragm chamber 28 to atmosphere. In this condition the spring 34 returns the power unit throttle rod 32 to zero throttle. The multivibrator 18 thus has two stable states on opposite sides of a proportional zone of control which may, for example be 200 r.p.m. above and below the set speed. Within the proportional zone the multivibrator 18 is astable with a duty cycle proportional to the D.-C. error voltage.

While the system has been described with regard to a cruise control mode of operation, the electronic control circuitry may be utilized in conjunction with the power unit 22 to provide an engine overspeed governor by reversing the mode of operation of the power unit 22. Mode reversal is accomplished by reversing diodes 88 and 100 and instead of returning resistor 106 and potentiometer 104 to battery, they are connected to ground. The diode 100 now accepts only the positive differentiated spike. The multivibrator 18 is now driven from the two-stables condition as well as in the astable condition but in a reverse mode of operation. Now when the vehicle engine speed is below the proportional zone existing about the manual set engine speed, the winding 36 is deenergized and the diaphragm chamber 28 is ported to atmosphere. This allows the driver to have full throttle control. When the engine speed is in the proportional control zone, the winding 36 is alternately energized to modulate the pressure in the diaphragm chamber 28. The change in pressure causes the power unit 22 to close or partially close the throttle. The multivibrator 18 must in this mode of operation be biased such that when the actual engine speed is below the set engine speed, the transistor 110 is on and the transistor 112 is off. When the engine speed is at the desired set speed, the same proportional control is obtained; however, when the engine speed is above the set speed, the multivibrator 18 is biased in the stable condition where transistor 112 is on and transistor 110 is off. This energizes the winding 36 which in turn allows vacuum to exist in the diaphragm chamber 28 which prevents further opening of the throttle by the vehicle operator.

While the invention has been described with regard to the preferred embodiment thereof, this should not be construed in a limiting sense. Modifications and variations thereof will now occur to those skilled in the art. For a definition of the invention, reference is made to the appended claims.

We claim:
1. In a motor vehicle having an engine and pulse generating means operatively connected to said engine for developing an input signal of a frequency corresponding to the actual speed of said engines,
engine speed control means comprising pulse shaping and counting means connected to said pulse generating means for developing a voltage proportional to the frequency of said input signal,
means for developing a voltage proportional to a desired engine speed,
means for developing an error voltage representing the difference between said actual engine speed and said desired engine speed,
a variable duty cycle multivibrator responsive to the error voltage for developing a substantially square wave output signal of constant frequency and having a duty cycle related to said error voltage,
a power unit responsive to the output of said multivibrator for controlling the throttle position of said engine.

2. Apparatus for controlling the speed of a motor vehicle engine comprising pulse generating means operatively connected to said engine for developing an input signal having a frequency corresponding to the actual speed of said engine,
a pulse shaping network responsive to said input signal for developing a substantially constant amplitude pulsating output signal of a frequency related to the frequency of said input signal,
a pulse counting network responsive to said pulsating signal for developing a D.-C. voltage proportional to the frequency thereof,
resistance means for developing a D.-C. voltage proportional to a desired engine speed,
amplifying means for developing an amplified error voltage proportional to the difference between said D.-C. voltages,
a multivibrator responsive to said error voltage for developing a pulsating output signal of constant frequency and having a duty cycle related to said error voltage,
an amplifier for amplifying said constant frequency output signal,
vehicle throttle control means connected to the output of said amplifier for positioning the vehicle throttle.

3. The apparatus defined in claim 2 wherein said pulse generating means comprises the distributor breaker point of the motor vehicle.

4. The apparatus defined in claim 3 wherein said multivibrator includes first and second transistor having emitter, base and collector electrodes, the emitter electrodes of each of said transistors being connected to a reference voltage through a common resistor,
said D.-C. error voltage being applied between the base and emitter of said first transistor,
means normally establishing a substantially constant voltage at the collector of said first transistor,
means normally biasing said second transistor into its linear range of operation,
a capacitor connecting the collector of said first transistor with the base of said second transistor.

5. The apparatus defined in claim 4 wherein said amplifier comprises a power transistor having emitter, base and collector electrodes,
the emitter electrode of said power transistor being connected to a source of substantially constant voltage,
said throttle control means being connected to the collector of said power transistor.
the base of said power transistor being connected to the collector of said second transistor.

References Cited
UNITED STATES PATENTS 3,088,538  5/1963  Brennan _____ 180—82.1
3,153,746  10/1964  Atkinson _____ 317—5

MARK NEWMAN, *Primary Examiner.*

RALPH D. BLAKESLEE, *Examiner.*